Patented Dec. 9, 1930

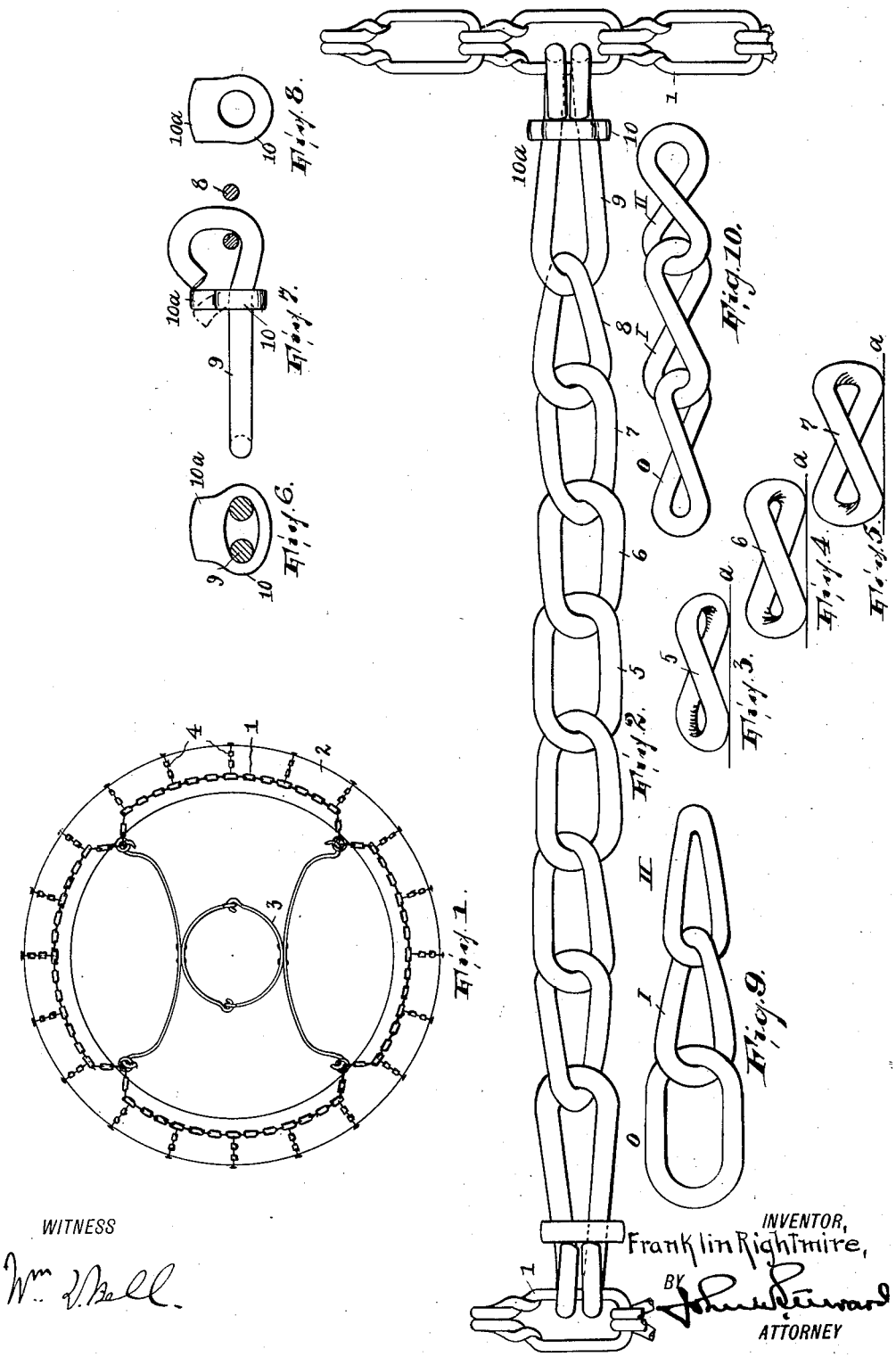

1,784,681

UNITED STATES PATENT OFFICE

FRANKLIN RIGHTMIRE, OF PATERSON, NEW JERSEY

TRACTION ATTACHMENT FOR VEHICLE WHEELS

Application filed December 8, 1927. Serial No. 238,482.

It has been proposed in my Patent No. 1,301,078 (and see also the Fichten Patent No. 1,349,149) to provide a cross-chain for a vehicle traction attachment which shall be graduated in gage in such manner that the portion of least gage shall be at the midportion of the cross-chain, whereby to attain certain advantages over ordinary crosschains, as increased traction and greater resistance of the cross-chain to wearing away and less wear and tear on the tire because a greater number of the component members are brought into effective action. But in that case the graduation resulted from in effect graduating each link in gage, or so that one end was of less gage or diameter than the other. This attained the named advantages but it entailed a construction which was difficult and unduly expensive to make and the links due to their shape were deficient in strength, especially at the middle of the cross-chain if the metal of the links were graduated in thickness, and encouraged rolling of the cross-chain. My object in the case of the present invention is to retain the advantages of the cross-chain set forth in my mentioned patent while eliminating its faults. This is accomplished by the crosschain herein set forth, which in the particular example to be described and shown presents still other advantages to be hereinafter stated. A further object is to provide means to retain the hooks commonly forming end members of each cross-chain on the endless side chains of the attachment which shall be inexpensive, readily adapted to the cross-chain and operative by simple hand-manipulation.

The drawing shows,

In Fig. 1 a side elevation of a vehicle wheel and a traction attachment in place thereon embodying the improved cross-chain;

In Fig. 2 the improved cross-chain in plan;

In Figs. 3, 4 and 5 three of the links of the cross-chain shown in Fig. 2, being all in side elevation as viewed from the same relative point;

In Figs. 6, 7 and 8 the device for accomplishing my second-named object, Figs. 6 and 7 being elevations thereof on the hook 9 and Fig. 8 an elevation thereof, detached; and Figs. 9 and 10 show in plan and side elevation, respectively, a modification of the invention, only the middle link and those at one side thereof being shown.

The attachment is shown in Fig. 1 as in general of that now well known type in which side-chains 1 (one at the outside and the other—Fig. 2—at the inside) are employed which are of less diameter than the pneumatic or other yielding tire 2 of the wheel and are connected at intervals by the cross-chains 4 composed of loop-links. (The device 3 is simply a means to keep the side chains tight, and may or may not be present.)

Each of these cross-chains is increased in gage from the mid-portion thereof toward each end, as in my said patent, with the result that with the tire under load a greater extent of the mid-portion of the cross-chain would support the tire and have traction with the ground than were the cross-chain of constant gage from end to end, as crosschains in common use are made.

(The term "gage" as used herein means that dimension which exists between points of the cross-chain—or any component member thereof—which are nearest to and those which are most remote from the tire when the cross-chain is normally positioned on the wheel.)

But, instead of graduating each link in gage, or in effect tapering the same, to attain this result, as in my patented construction, and while as indicated the cross-chain as a whole is graduated in gage, the two ends of each link are of equal gage. This is graphically illustrated by Figs. 3, 4 and 5 which show the middle link 5 and the next two links 6 and 7 at either side thereof detached and all in side elevation as viewed from the same relative point. Each of these links is end for end of the same gage (i. e., the height from the base-line $a$ at one end thereof is equal to that from said base-line at the other end) and also in fact of the same form but the twist of link 6 is of greater degree than that of link 5 and the twist of link 7 greater than that of link 6, so that the heights of the three links are increased or stepped up, from 5 to 6 to 7. The twist and consequently the height of the link 8 may be greater also than that of link 7, and desirably so, as in fact shown in Fig. 2, especially as it will then be best positioned for receiving the hook 9 of standard form for attaching the end of the cross-chain to a side-chain 1.

In the example herein described and illustrated the graduation of the gage of the cross-chain is a matter of twisting the links different degrees; but so long as the cross-chain when normally positioned on the wheel is increased in gage from its mid-portion toward each end and each of its links is formed with its end portions of substantially equal gage my invention will be fulfilled.

Of course it is not essential that there be as shown only one link or member at the mid-portion of the cross-chain having the least gage, or only one member at each side thereof having one of the other gages.

My invention involves this further feature, to wit, that while the cross-chain increases in gage from the mid-portion toward each end it increases in width from each end toward the mid-portion when the cross-chain is normally positioned on the tire. This will appear from Fig. 2 and in the example, where twisted loop-links are shown, is the result of the twists of the links 5, 6, 7 and 8 being increased in that order. This produces smoother riding and at the same time further increases the traction, especially since broadening the links toward the mid-portion adapts such links for resisting rolling, which tends to strain and is well recognized as frequently the cause of breaking the cross-chain. This part of my invention is not dependent on the gage of the two ends of each link being the same, as will be seen by Figs. 9 and 10. In these diagrammatic views, which show only a center link and two links at one side thereof, only the ends of the mid-link O may be equal in gage but the end of each link I and II which is the outer, or more remote from link O, is in the twisting made of greater gage than its relatively inner end. Such a construction would obviously result in the cross-chain increasing in gage from its mid-portion (link O) toward each end (link II) and its width increasing from each end toward its mid-portion.

Figs. 6, 7 and 8 show a device 10 which is adapted to retain the hook 9 against accidental disengagement from end-link 8. Device 10 is a stout collet of elastic rubber which may be stretched and fitted over the shank of hook 9 so as to stand with some portion, as a hump 10a thereof, close to the end of the hook proper 9a of such hook. Hump 10a prevents such accidental detachment, but it may be sent back to the dotted-line position shown to permit link 8 to clear the hook-proper. No tool is required in the manipulation, which can be readily performed by hand.

Having thus fully described my invention, what I claim is:

1. A vehicle traction attachment of the class described including a cross-chain having increasing gage from its mid-portion toward each end thereof but having each of its links formed with its end portions of substantially equal gage.

2. A vehicle traction attachment of the class described including a cross-chain composed of loop-links each twisted around an axis extending lengthwise of the cross-chain and each having its end portions of equal gage, each link outward of the middle link being of greater gage than the next inward link.

3. A vehicle traction attachment of the class described including a cross-chain composed of loop-links each twisted around an axis extending lengthwise of the cross-chain and each having its end portions of equal gage and said ends substantially counterparts in form of each other, the links increasing in gage from the mid-portion toward each end of the cross-chain.

4. A vehicle traction attachment of the class described including a cross-chain having increasing gage from its mid-portion toward each end thereof and having increasing width from each end toward the mid-portion thereof.

5. A vehicle traction attachment of the class described including a cross-chain having its links graduated so as to increase in gage from the mid-portion toward each end of the cross-chain and so as to increase in width from each end of the cross-chain toward said mid-portion.

6. A vehicle traction attachment of the class described including a cross-chain having each of the links from its mid-portion toward one end of the chain of greater gage at the outer end than at the inner end of such link and each at the inner end of greater width than at the relatively outer end of such link, each such link being also of greater gage than the next inner link and of greater width than the next outer link.

7. A vehicle traction attachment of the class described including a traction element to traverse the vehicle wheel tread having gradually increasing gage from its mid-portion toward each end thereof and having its extreme traction surface of gradually increasing width from each end toward the mid-portion thereof.

In testimony whereof I affix my signature.

FRANKLIN RIGHTMIRE.